United States Patent [19]
Bied-Charreton et al.

[11] 4,001,564
[45] Jan. 4, 1977

[54] COMMUNICATION SYSTEM FOR DISSEMINATING CODED DIGITAL DATA IN ANALOGUE FORM UTILIZING AN ORTHOGONAL TRANSFORMATION

[75] Inventors: Philippe Bied-Charreton; Francois Le Carvennec; Erich Spitz, all of Paris, France

[73] Assignee: Thomson-CSF, Paris, France

[22] Filed: Nov. 15, 1974

[21] Appl. No.: 524,270

[30] Foreign Application Priority Data
Nov. 16, 1973 France .................... 73.40880

[52] U.S. Cl. .................. 235/152; 179/15 BC; 235/150.5; 325/42; 340/347 DA; 360/40
[51] Int. Cl.$^2$ .................................. G06F 7/38
[58] Field of Search ....... 235/152, 197, 156, 150.5; 360/40; 340/347 DD, 347 DA, 347 AD; 179/15 BC; 340/146.1 AL, 146.1 F; 325/42, 65

[56] References Cited
UNITED STATES PATENTS

| 3,337,858 | 8/1967 | Gillis et al. ................ 360/40 |
| 3,398,239 | 8/1968 | Rabow .................... 178/66 |
| 3,701,134 | 10/1972 | Gillard .................... 360/40 |
| 3,792,355 | 2/1974 | Miyata et al. ........... 179/15 BC X |

Primary Examiner—Joseph F. Ruggiero
Attorney, Agent, or Firm—Cushman, Darby & Cushman

[57] ABSTRACT

The present invention relates to the dissemination of binary digital data by analogue transmission or storage. The object of the invention is a communication system in which, prior to dissemination, the binary data are grouped into blocks forming vectors with N components, which are transformed into orthogonal vectors with N analogue components; after dissemination, the vectors experience a reverse transformation which makes it possible to reconstitute the binary digital data.

10 Claims, 8 Drawing Figures

COMMUNICATION SYSTEM FOR DISSEMINATING CODED DIGITAL DATA IN ANALOGUE FORM UTILIZING AN ORTHOGONAL TRANSFORMATION

The present invention relates to communication systems designed to disseminate information across a channel, said information occuring in the form of a succession of binary digital data, referred to as bits.

The dissemination of information can be effected by means of channels such as a transmission line or a physical vehicle constituted for example by a magnetic carrier capable of storing the data for dissemination, in an appropriate form. Whether it be the communication methods of transmission or the methods of storage which are involved, binary digital data are extremely vulnerable to certain kinds of disturbances which are capable of reversing the value of the bits. Such disturbances are generally of short duration and can be brought about in particular by short discontinuities known as drop outs which occur during read-out of a magnetic data carrier.

Quite apart from the problem of such disturbances, the dissemination of binary digital data likewise poses the problem of the transmission or storage density which it is possible to achieve for a given error rate.

If we compare the characteristics of magnetic data storage systems, then it will be seen that the storage density attained using analogue data, reaches a much higher figure than that attained with the direct storage of data bits. It will be observed, furthermore, that magnetic recording systems and magnetic data carriers are particularly expensive to manufacture if it is necessary to record and read-out binary signals with a low error rate. By contrast, the kinds of equipment used for the magnetic recording of analogue signals, such as magnetoscopes and tape-recorders, permit much wider tolerances to be used so that the costs of manufacture and operation are more economical. Similar observations can be made about the long-range transmission of binary or analogue data.

In order to improve digital data dissemination systems, and other things being equal, the invention proposes that the transmission and/or storage of such digital data should be carried out in an analogue form. To this end, the invention proposes that digital data should be sub-divided into blocks of N 0 and 1 bits in order to form vectors having N binary components; these vectors are then subjected to an orthogonal transformation which produces in their place vectors having N analogue components which are disseminated in their stead; after dissemination, the analogue component vectors are in turn subjected to a reverse transformation operation, reconstituting the original vectors. The binary components of these reconstituted vectors can exhibit modifications which are much less marked than those which they would have exhibited in the absence of said transformation operations.

In accordance with the present invention, there is provided a communication system for the dissemination of digital data constituted by a succession of 0 and 1 bits coming from a data source, said communication system comprising: grouping means fed from said data source for grouping said bits in the form of vectors of N binary components, orthogonal transformation means receiving the vectors having said binary components and converting then into orthogonal vectors each having N analogue components, analogue means arranged for disseminating said orthogonal vectors, reverse transformation means receiving the disseminated orthogonal vectors, available at the output of said analogue means, and means for reconstituting said succession of bits from the reconstructed vectors of N binary components furnished by said reverse transformation means.

For a better understanding of the present invention, and to show how the same may be carried into effect, reference will be made to the following description and the attached figures among which.

In the following, the description has been confined to the method of data dissemination which consists in storing the data on a magnetic substrate, although the method could equally well involve dissemination using some other kind of data carrier without in any way excluding the possibility of line transmission which requires no storage at all.

Figure 1:
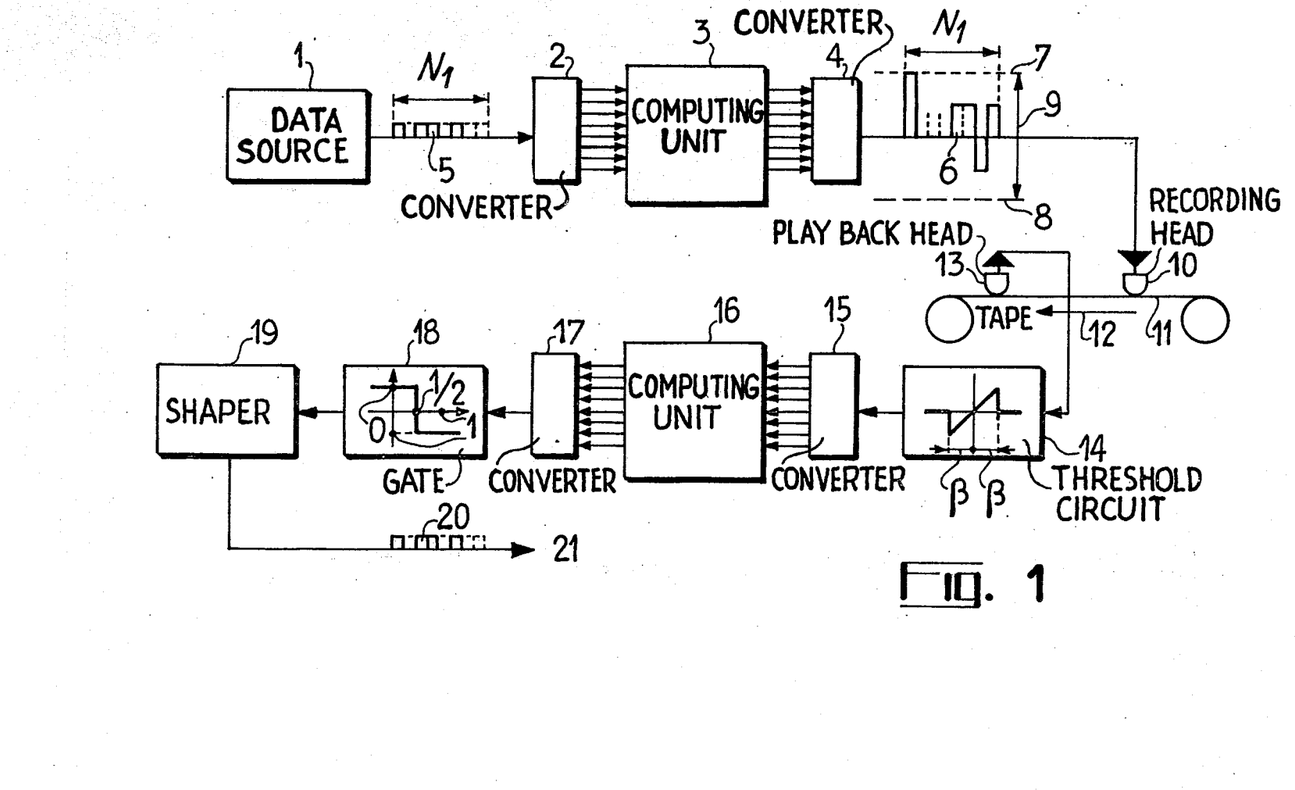
FIG. 1 is a block diagram of a binary digital data communication system utilising analogue magnetic recording of said data.

In FIG. 1, thre can be seen a data source 1 which can uninterruptedly supply 0 and 1 bits, and a magnetic recording device comprising, as those skilled in the art will understand:

a recording head 10, a read-out head 13, a magnetic tape 11 and means for causing said tape 11 to transfer in front of said heads 10 and 13 in the direction indicated by the arrow 12. It is well known to effect direct recording of binary data coming from the source 1, by connecting the latter to the recording head 10. The reconstitution of the data is then achieved directly at the output of the read-out head 13. This kind of direct recording must be performed with a low error rate and this requires that each bit be assigned a storage area of the order of $10^3$ microns squared. Moreover, in order to achieve satisfactory performance levels, it is necessary to utilise magnetic data carriers in respect of which the defect probability is less than $10^{-5}$ or $10^{-6}$.

In view of the fact that the bits are recorded one by one, only a short disturbance is necessary to cause bit reversal. Under these circumstances, noise protection is difficult to ensure. Those skilled in the art will be aware that disturbances of this kind occur locally along a data carrier in the form of discontinuities (drop-outs) or saturation states which can reverse the value of a "one" o a "zero".

Parallel with the direct magnetic recording of the bits, there is a section for the magnetic recording of analogue signals, which comprises apparatus in respect of which a much higher error rate is accepted and where an area of the order of 30 microns squared is accepted for each useful information element. This case arises in particular where magnetic recording of video frequency signals utilised for the transmission of television pictures, is involved.

In another context, the invention consists in utilising a communication apparatus designed to disseminate analogue data, for the purpose of recording or transmitting binary digital data with a considerably reduced error rate. This result is achieved by an appropriate transformation of the binary data, carried out prior to and during the phase of dissemination proper.

Referring again to the diagram in FIG. 1, between the data source 1 and the recording head 10 there has been arranged an assembly of means which make it possible to transform a block 5 of $N_1$ 0 and 1 bits into a block 6 of $N_1$ analogue components whose extreme values are located within an amplitude range 9 defined by the limits 7 and 8.

The system used to process the binary digital data comprises means 2 for the series-parallel grouping of said data, which are successively supplied with the $N_1$ bits 0 and 1 from the unit 5 and transform them into a vector with $N_1$ simultaneous components respectively having the values of said bits. The grouping means 2 are followed by a transforming unit with $N_1$ inputs and $N_1$ outputs, which converts the vector with $N_1$ binary components, into a vector with $N_1$ analogue components. The transformed vector is transmitted to a parallel-series converter 4 which restores the order of succession of the analogue components, this being necessary for the purpose of their recording on the carrier 11 by means of a single recording head. This converter is unnecessary if the $N_1$ analogue components are recorded simultaneously by means of $N_1$ recording heads 10.

Because of the processing which they experience prior to recording, the binary digital data are no longer available directly at the output of the read-out head 13. Therefore, in order to read them out, a reverse transformation system must be provided.

This system essentially comprises a series-parallel converter 15 supplied with the analogue signals furnished by the read-out head 13 and in its turn supplying analogue component vectors similar to those furnished by the computing unit 3; the read-out system furthermore comprises a reverse computing unit 16 which reconstitutes a binary component vector having the composition of the block 5. The system additionally comprises a threshold transmission circuit 14, a logic lever discriminator 18 and a reshaping circuit 19. Moreover, a parallel-series converter 17 re-establishes the normal sequence of the bits so that the output 21 a block or vector 20 of data identical to the block 5, appears.

In a general way, the operation of the system shown in FIG. 1 is as follows:

At the time of recording or in other words write-in, the data are grouped in vectors of $N = 2^p$ bits, where $p$ is a positive whole number. Each block of bits is equal to a vector $[D_o]$ with N binary components. The vector $[D_o]$ is transformed by computation to a vector $[A_o]$ which is recorded on the magnetic carier. This transformation can be written in accordance with the rules of matrix algebra, as:

$$[A_o] = [M][D_o]$$

where [M] is the transformation matrix.

After read-out of the recording, and reverse transformation, a vector with analogue components [A] and a vector with binary components [D] are associated by the relationship:

$$[D] = [M]^{-1}[A]$$

The error between the read-out vector [A] and the recorded vector $[A_o]$ depends upon the noise which is introduced and which can be represented by the vector [B]. thus, we have:

$$[A] = [A_o] + [B]$$

and, applying the preceding relationships, we obtain:

$$[D] = [M]^{-1}[A_o] + [B]$$

$$[\Delta] = [D] - [D_o] = [M]^{-1}[B]$$

[Δ] is the disturbance factor which translates the error between the input vector $[D_o]$ nd the output vector [D] of the system.

Serious defects in the magnetic recording are point type defects, such that the noise vector [B] has only a few non-zero components. The optimum transformation defined by the matrix [M] is that which distributes the non-zero components of the noise [B] in the expression for [Δ]. The orthogonal transformations represented by matrices without zero coefficient, satisfy this condition. To achieve a uniform distribution of the non-zero noise components, a further condition is that the elements of the coding matrix [M] should have the same modulus.

Using these two criteria, it will be seen that of the relevant tranformations, the Fourier transform and the Walsh-Hamadard transform are appropriate ones. From the practical point of view, the Walsh-Hadamard transform offers the advantage of simply requiring the calculation of the sums and differences of relative numbers. By contrast, the Fourier transform requires more elaborate calculations since it involves sums and products of complex numbers.

In the ensuing description, it is the orthogonal Walsh-Hadamard transform which has been described by way of non-limitative example. Following this hypothesis, the incidence of a point defect which can be ascribed to the magnetic carrier 11, in the disturbance factor [Δ can be calculated by taking the components of the vector [B] as follows:

$$[B] = \beta_i (0, 0, 0, \ldots 0, 1, 0 \ldots 0, 0)$$

where $\beta_i$ is the value of the component of index $i$ disturbed by the point defect.

Thus, we obtain:

$$[\Delta] = [H][B]$$

where [H] is the Hadamard matrix.

By way of a concrete example if [B] is a four-component vector, then we have:

$$[\Delta] = \beta_i \frac{1}{\sqrt{N}} \begin{vmatrix} 1 & 1 & 1 & 1 \\ 1 & -1 & 1 & -1 \\ 1 & 1 & -1 & -1 \\ 1 & -1 & -1 & 1 \end{vmatrix} \begin{vmatrix} 0 \\ 0 \\ 1 \\ 0 \end{vmatrix} = \beta_i \frac{1}{\sqrt{N}} \begin{vmatrix} 1 \\ 1 \\ -1 \\ -1 \end{vmatrix}$$

where $N = 4$.

We can conclude from this that the defect localised in the third component has the effect of producing, the sign excepted, a uniform distribution in the components of $[\Delta]$; the result is disturbance amplitude $\sqrt{N}$ times smaller than the amplitude of the defect. Assuming that blocks of 256 bits are being used, the incidence of a defect will be reduced to a sixteenth of its value in each of the binary components of the reconstituted vector.

It is worthwhile understanding how a binary vector constituted for example by a block of eight bits, such as the block 5 in FIG. 1, is transformed. This block can be written $[D_o] = (1, 0, 1, 1, 0, 1, 0, 0)$. The orthogonal vector produced by the block 3 can be written:

$$[A_o] = [H_n] [D_o]$$

$$= \frac{1}{\sqrt{8}} (4, 0, 0, 0, 2, 2, -2, 2)$$

The probability distribution of the amplitudes of the components of the vector $[A_o]$ obeys the following rules:

a. to within the factor $$\frac{1}{\sqrt{N}}$$

the first component $A(o)$ has a mean value which is given by the mean number of 1 bits in the block of N bits; thus, we obtain:

$$\overline{A(o)} = \frac{\sqrt{N}}{2}$$

b. the mean value of the components $A(i)$ for $i \neq 0$ is zero.

Thus, $\overline{A(i)} = 0$ c. if it is desired to be able to store all the components of the vector $A_o$ within the same amplitude interval, then the component $A(o)$ must be subjected to an amplitude translation of $$\frac{\overline{\phantom{A}}}{A_o} = \frac{\sqrt{N}}{2}$$

All the components obey the same probability law and, knowing that the components of the vector $[D_o]$ are random variables having a root mean square deviation $\sigma D$ equal to ½, the root mean square deviation $\sigma A$ of the translated components of the vector $[A_o]$ is likewise equal to ½ since the transform is an orthogonal one.

d. the maximum amplitude of the components of the vector $[A_o]$ is $$\pm \sqrt{\frac{N}{2}}$$

after a translation of $A(o)$, one of these extreme values being reached when the block of N bits contains $(N/2)$ 1 bits arranged in the order of a Walsh sequence.

Figure 2:
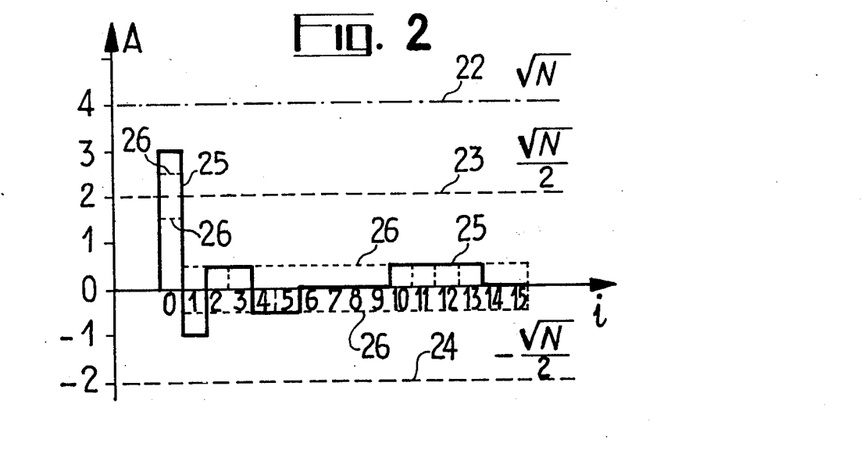
FIG. 2 illustrates a vector with 16 analogue components, obtained by an orthogonal Walsh-Hadamard transformation.

These various characteristics can be checked against FIG. 2 which illustrates a vector $[A_o]$ with 16 components represented by the rectangular envelope line 25. It will be seen that the first component $A(o)$ of order $i = 0$ is, prior to translation, situated beneath the line of level 22 which corresponds to the amplitude $A = \sqrt{N}$. After a translation of $A(o)$ all the components of the vector $[A_o]$ are regrouped between the lines of levels 23 and 24. The dashed lines 26 delimit a range corresponding to the standard deviation ½. This range is centred around the mean value $$\sqrt{\frac{N}{2}}$$

of $A(o)$ and the mean value zero of the $A(i)$ values of order $i \neq 0$.

From the preceding examples, it will be seen that the components of an orthogonal vector $[A_o]$ obtaind by the Walsh-Hadamard transform of a binary vector having N components, are contained in an amplitude interval $\xi$ the boundaries 7 and 8 of which are respectively $$\sqrt{\frac{N}{2}} \text{ and } -\sqrt{\frac{N}{2}}$$

if we are careful to translate $A(o)$ by the distance $(N/2)$. This shows us that it is possible to store the components of $[A_o]$ by fully using the linear portion of the recording characteristic of a magnetic analogue data recorder. This being done, it is possible to detect and correct the errors corresponding to amplitude levels of very low probability.

Figure 3:
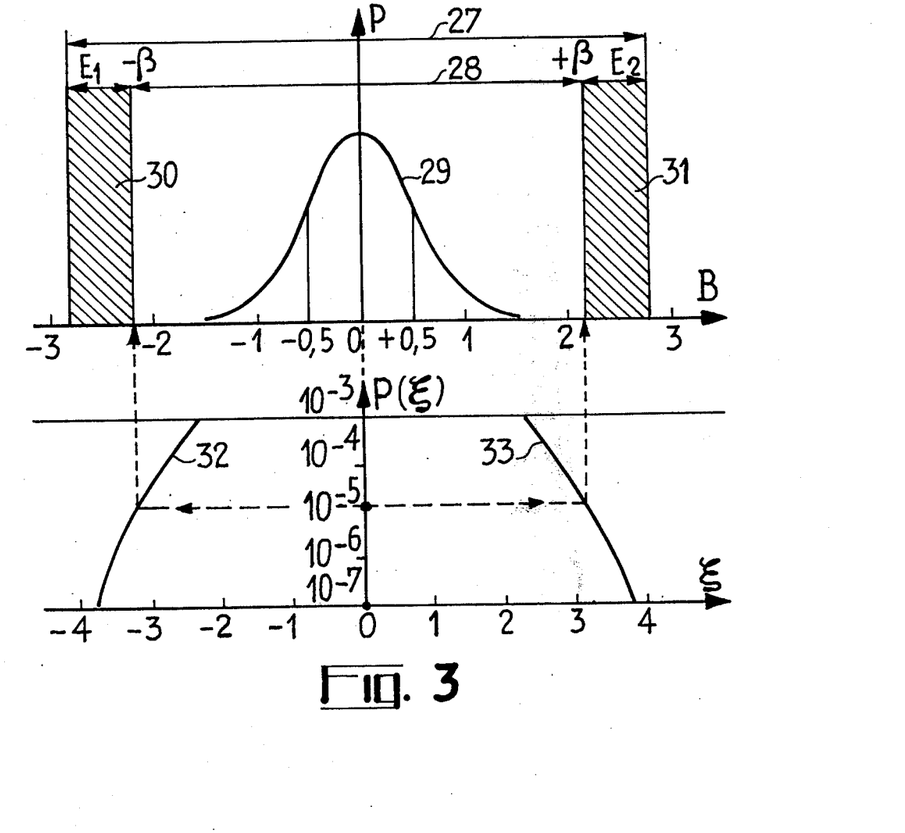
FIG. 3 is an explanatory diagram.

From what has been said thus far, it will be evident that the probability distribution of the amplitudes of the components of the orthogonal vector resulting from the Walsh-Hadamard transform, can be represented by the peaked graph 29 of FIG. 3. The distribution illustrates is the Gaussian distribution since it results in higher probabilities than those which are obtain in accordance with a less strict probability law.

FIG. 3 has been constructed for a vector $[A_o]$ with 32 analogue components, having an amplitude B with which there corresponds the reduced diviation $\xi = \sqrt{2} B$. These two quantities are plotted on the abscissae on separate scales. On the ordinates, there have been plotted on the one hand the probability P relating to the abscissae values B, and on the other hand the probability P $(\xi)$ relating to the abscissae values $\xi$. This probability is the probability with which the amplitude of a component of the vector $[A_o]$, after a transposition of $A(o)$, will exceed the value B or $\xi$. The graph sections 32 and 33 represent the bottom parts of the peaked graph 29, and have been plotted using a largarithmic scale on the ordinates, corresponding to very low probabilities. The amplitude interval 27 contains all the amplitudes which can be acquired by the components of the vector $[A_o]$. The amplitude interval 28 having as its boundaries the thersholds $+\beta$ and $-\beta$ encloses the most probable values of the amplitudes of the components of the vector $[A_o]$. The two cross-hatched bands 30 and 31 of respective widths $E_1$ and $E_2$, correspond to component amplitudes in respect of which the probability of the threshold $\beta$ being exceeded is certainly less than $P(\xi) = 10^{-5}$. Also, from a consideration of FIG. 3, it will be observed that the most probable amplitude of a component of the transformed vector $[A_o]$, is equal to zero and that the probability tends towards zero at the boundaries of the interval 27.

FIG. 3 can be used as a basis by which is evaluate the performance level which can be expected of the communication system in accordance with the invention. In the course of operation, there are various factors which may be at work to falsify the reconstitution of the blocks of bits. Amongst these factors we have to consider point magnetisation defects due, for example, to dust, which give rise to zero or saturated read-out signals such as the "drop-out" phenomena encountered in video-recording. It is possible to detect these defects because there correspond to them values of the components of the transformed vector $[A_o]$, which have a very low probability. If we fix an interval between the boundaries $+\beta$ and $-\beta$ outside which these point defects are assumed to be localised, the probability $P(\beta)$ of encountering a component of the vector $A_o$ outside this interval, has a top limit of $P(\beta) = \text{erfc}(\beta)$ where erfc is the complementary error function.

As soon as the threshold $\pm\beta$ has been exceeded by a read-out amplitude, this can be attributed to a point defect and to correct this disturbed amplitude, it may be decided to substitute for it the most probable value which is zero. This method of mean correction comes down to introducing into the read-out channel, a threshold transmission device of the kind marked 14 in FIG. 1. This device 14 transmits linearly any amplitudes which are less in absolute value than the threshold $\beta$, and substitutes for them the value zero beyond the threshold $\beta$.

If this kind of detection and correction of the point defects is adopted, the error introduced into the components of the reconstituted vector $[D]$, can be obtained by dividing the interval $\beta$ by the distribution factor $\sqrt{N}$. Thus, we obtain the condition which determines the width of the disturbance:

$$\left| [D] - [D_o] \right| = \frac{\beta}{\sqrt{N}}$$

To ensure that this kind of disturbance does not produce reversal of the value of the bits which it affects, it is necessary that the condition $$\frac{\beta}{\sqrt{N}} < \frac{1}{2}$$

should be satisfied.

Figure 5:
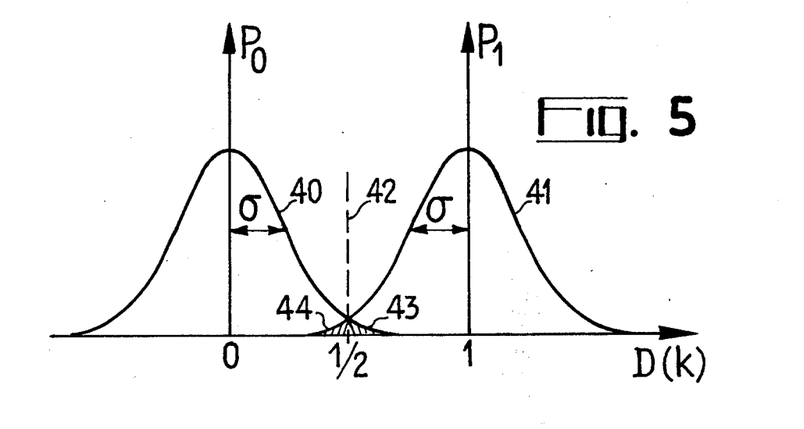
FIG. 5 is an explanatory diagram.

FIG. 5 in fact illustrates the principle of detection of 0 and 1 bits in the presence of noise. The amplitudes $D(k)$ of the components of order $k$ of the reconstituted binary vector, are plotted on the abscissae about the values 0 and 1. The probability distributions $P_o$ and $P_1$ of the 0 and 1 values are represented respectively by the two peaked graphs 40 and 41, which have the same standard deviation $\sigma$. The graphs 40 and 41 intersect at their bases at the abscissae value ½ of the decision level. The cross-hatched zone 44 illustrates the probability of reversal of a 1 bit and cross-hatched zone 43 illustrates the probability of reversal of a 0 bit. In FIG. 1, the element which decides the probable value of the reconstituted bits is the transmission circuit 18 whose decision threshold is adjusted to ½. A circuit for reshaping bits, 19, follows the decision element 18. The foregoing out of balance equation can be put in the form:

$$N > 4\beta^2$$

This condition links the threshold of detection of point defects, with the number of bits N in the blocks.

The point error rate $T_d$ for a block of N components is given by the relationship:

$$T_d = N \cdot P_d \cdot P(\beta)$$

where $P_d$ is the probability of a point defect in the readout device used.

The foregoing analysis has assumed that the exceeding of the threshold is the sign which indicates the existence of a point defect. In fact, the threshold $\beta$ is exceeded on occasions which are due to real components, albeit of very low probability, of the vector $[A_o]$. These occasions constitute false alarms the ratio $T_f$ of which, for a block of N bits, is given by:

$$T_f = N \cdot P(\beta)$$

By comparing this false alarm ratio with that of the point defects, we see that:

$$T_d = P_d \times T_f$$

The result is that with a defect probability as high as $P_d = 10^{-2}$, the point error rate $T_d$ becomes negligible compared with the false alarm ratio. This means that in the system in accordance with the invention, it is possible to utilise magnetic carriers of very much inferior quality to those used for the direct recording of binary data, where $P_d$ must be less than $10^{-5}$.

Figure 4:
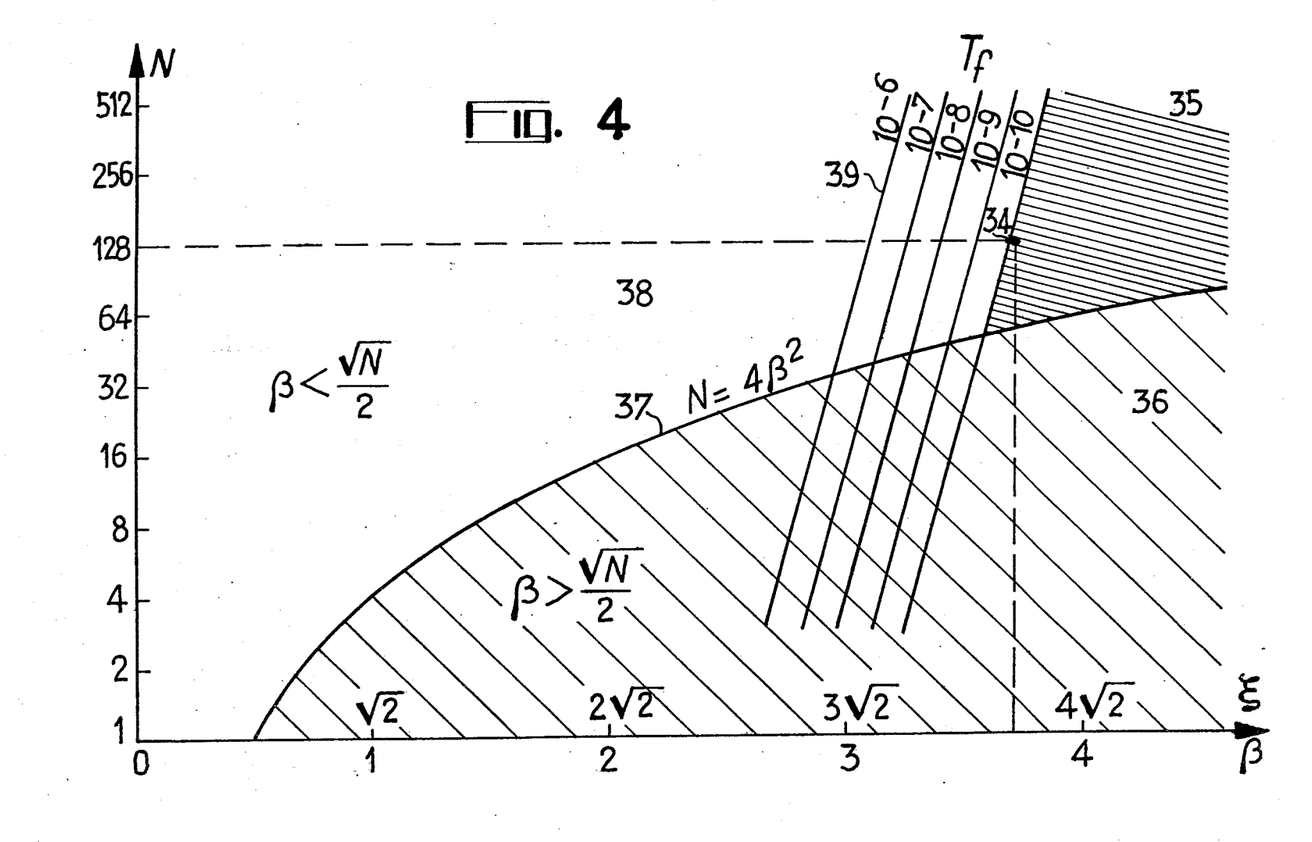
FIG. 4 is a nomograph illustrating a possible example of operation.

The nomograph of FIG. 4 makes it possible to choose a combination of values (N, $\beta$) which takes account of the false alarm ratio $T_f$ not to be exceeded. On the ordinates, the number of bits in the blocks have been plotted and on the abscissae the detection threshold value $\beta$ with the corresponding reduced error. The graph 37 of the equation $N = 4\beta^2$, defines a zone 38 where there is no reversal of 0 and 1 bits. The cross-hatched zone 36 must not contain a system operating point because bit reversal takes place there. On the nomograph a family of lines 39 has also been shows, the parameter for this family being the false alarm ratio $T_f$. The zone 35 located to the right hand side of the line 39 corresponding to the chosen value of $T_f$, and above the curve 37, is the useful zone within which the working point of the system in accordance with the invention should be chosen.

In the foregoing, it has been assumed that in order to correct an amplitude which exceeds the threshold $\beta$, the most probable value 0 should be substituted for it. It is also possible to choose a stricter criterion which consists in assuming that the error occurring before distribution, in the components of the vector $[D]$ is equal to $2\beta$ instead of $\beta$.

In this case, the graph 37 would have to satisfy the equation $N = 16\beta^2$. Hitherto, we have left aside any consideration of random noise in the analogue magnetic recording device. This noise breaks down into two components:

a. The quantising noise which is due to the limited precision of calculation of the orthogonal transform of the vectors;

b. The inherent magnetic recording noise which is evaluated by the ratio $\gamma$ of the effective signal energy to the noise energy.

The quantising noise can be rendered negligible vis-a-vis the noise inherent in the magnetic recording. If we call $\sigma_M$ the standard deviation of the noise, which experiences no change during the course of the reverse transformation, then of course the error ratio $T_a$, that is to say the probability of reversal of 0 and 1 bits, is given by the expression:

$$T_a = \frac{1}{2} \text{erfc} \left( \frac{\sqrt{\gamma}}{2} \right)$$

Figure 6:
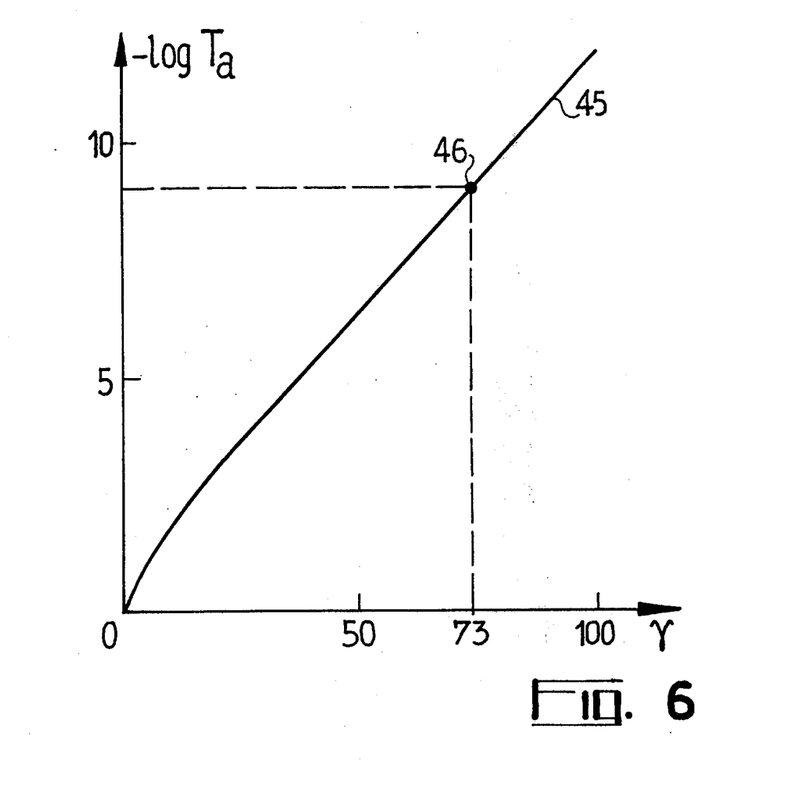
FIG. 6 is a nomograph indicating the relationship linking the error rate to the signal-to-noise ratio of the analogue magnetic recording.

This expression has been plotted in FIG. 6 in the form of a graph 45. On the abscissae there have been plotted the signal-to-noise rate $\gamma$ and on the ordinates the logarithm to the base 10 of the error rate $T_a$ due to the random noise. The point 46 indicates that an error rate $T_a$ of $10^{-9}$ requires a signal-to-noise ratio of better than 73. Such a low value on the part of the signal-to-noise ratio is readily achieved using analogue magnetic recorders of the magnetoscope type.

In a practical embodiment, the values of $T_d$, $T_f$, and $T_a$ will be chosen in order to satisfy the double out of balance equation:

$$T_d < T_f < T_a$$

The chief limitation of the system in accordance with the invention is due, therefore, solely to the limitation on the signal-to-noise ratio at the analogue magnetic recording level.

We have seen that the components of the vector $[A_o]$ are likewise affected by a noise component of mean value zero and standard deviation $\sigma_M$. Thus, all the components $A(i)$ located within an interval $dA = \sqrt{2} \sigma_M$ should be regarded as undiscernible. Accordingly, the full interval $\Delta A = 2 \beta$ will then enable a number $n$ of discernible levels, equal to:

$$n = 2 \beta \sqrt{\gamma}$$

to be defined; in other words $$\gamma = \frac{1}{2 \sigma M^2}$$

The storage of $n$ discernible levels in the magnetic carrier, will require an area equal to $\log_2 n$ times the area required for an information or data element. If, for example, blocks of 128 components and a signal-to-noise ratio of $\gamma = 73$, with a threshold of $\beta = 3.7$, are adopted, then it will be seen that $n = 64$ discernible levels are required. Using a density of 30 square microns per stored point, each component will require a storage area of $6 \times 30 = 180$ stored microns.

In conventional binary data magnetic storage systems, using the chosen error rate of $10^{-9}$, a storage area of the order of 1000 square microns per bit, is required. Thus, the communication system in accordance with the invention improves the storage density but to a lesser extent than that which is obtained when storing television signals where the permissible error rate is higher.

Figure 7:
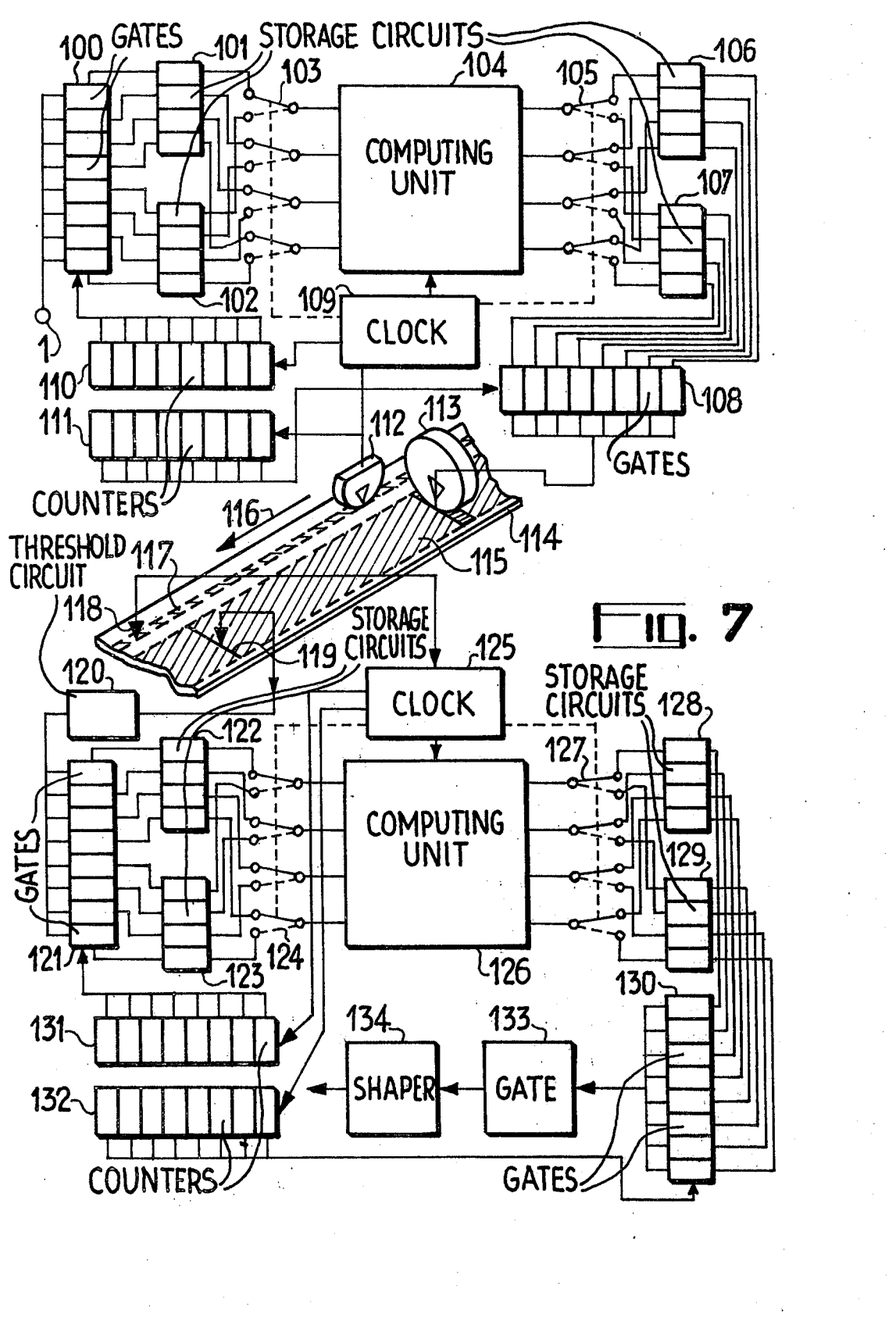
FIG. 7 illustrates a communication system for the dissemination of binary digital data, in accordance with the invention.

In FIG. 7, there can be seen a practical example of the system of disseminating binary data, in accordance with the invention. For the sake of clarity of the drawing, the number of components in each block has been limited to four although in reality this number is very much larger.

To the input 1 of the system there is connected the binary digital data source. An assembly 100 of analogue gates controlled by a first counter 110 routes the 0 and 1 bits corresponding to two consecutive blocks of four components, towards analogue storage circuits 101 and 102. At the outputs of the store unit 101, there are simultaneously available the four components of a vector $[D_o]$, and at the outputs of the store unit 102 there are simultaneously produced, during a later phase of operation, the four components of another vector $[D_o]$. A switching circuit 103 represented by a stack of reversing switches, makes it possible to apply the components of $[D_o]$ coming from the unit 101, to input terminals of a computer unit 104 which is capable of performing the orthogonal transform of the vector $[D_o]$ into the transformed vector $[A_o]$; the analogue components of the vector $[A_o]$ are transmitted by another switching circuit 105, represented by a stack of reversing switches, to a block of analogue stores 106. The computer unit 104 is alternately connected to the blocks or units, 101 and 106, during a first phase of operation and to their counterparts, 102 and 107, during the second phase of operation. The blocks of analogue stores 106 and 107 supply an assembly of logic gates 108 controlled by a second shift-register 111. A clock 109 controls the various operations and furnishes a reference signal to a recording head 112 recording a track 117 on the surface of a magnetic data carrier 114 displacing in the direction 116. Another recording head 113, which can perform a rotational motion in order to increase the speed of displacement of its reading gap relatively to the magnetic data carrier 114, is used to record the data. This main recording head 113 is supplied by the combined outputs of the assembly of analogue gates 108. The magnetic carrier 114 is thus magnetised along two tracks 115 and 117; the track 115 comprises a succession of recorded sections corresponding in each case to a block of binary digital data received at the input 1; the track 117 is the synchronising track which is used to precisely mark the data blocks stored in the track 115. Self evidently, the track 115 could be subdivided into N parallel tracks and the recording head 113 could itself also be divided into N elementary heads to which the simultaneous components of the transformed vector $[A_o]$ could be applied.

The read-out of the data recorded on the magnetic carrier 114, is effected by means of two read-out heads 118 and 119 which respectively read the tracks 117 and 115. The read-out head produces a synchronising signal which is used to synchronise a clock 125. The read-out signal produced by the main read-out head 119, is fed through a threshold transmission circuit 120 similar to that 14 of FIG. 1; it is then applied to an assembly 121 of analogue gates controlled by a counter 131. The outputs of the analogue gates of the assembly 121 are connected to the inputs of two blocks of analogue stores 122 and 123. Switching means 124 make it possible to connect the outputs of one of the two store blocks 122, 123 to the inputs of a computer unit 126 which is capable of performing the reverse transform of the analogue component vectors [A] into binary component vectors [D]. Second switching means 127 make it possible to alternately transmit the signals produced by the outputs of the computer unit 126, to a first block of analogue stores 128 or to a second block of analogue stores 129. The outputs of the blocks 128 and 129 are connected to an assembly of analogue gates 130 controlled by a second counter 132. The binary components successively available at the grouped outputs of the analogue gates 130, are transmitted to a decision circuit 133 similar to that 18 shown in FIG. 1. The output of the decision circuit 133 supplies a circuit 134 which reshapes the 0 and 1 bits.

Figure 8:
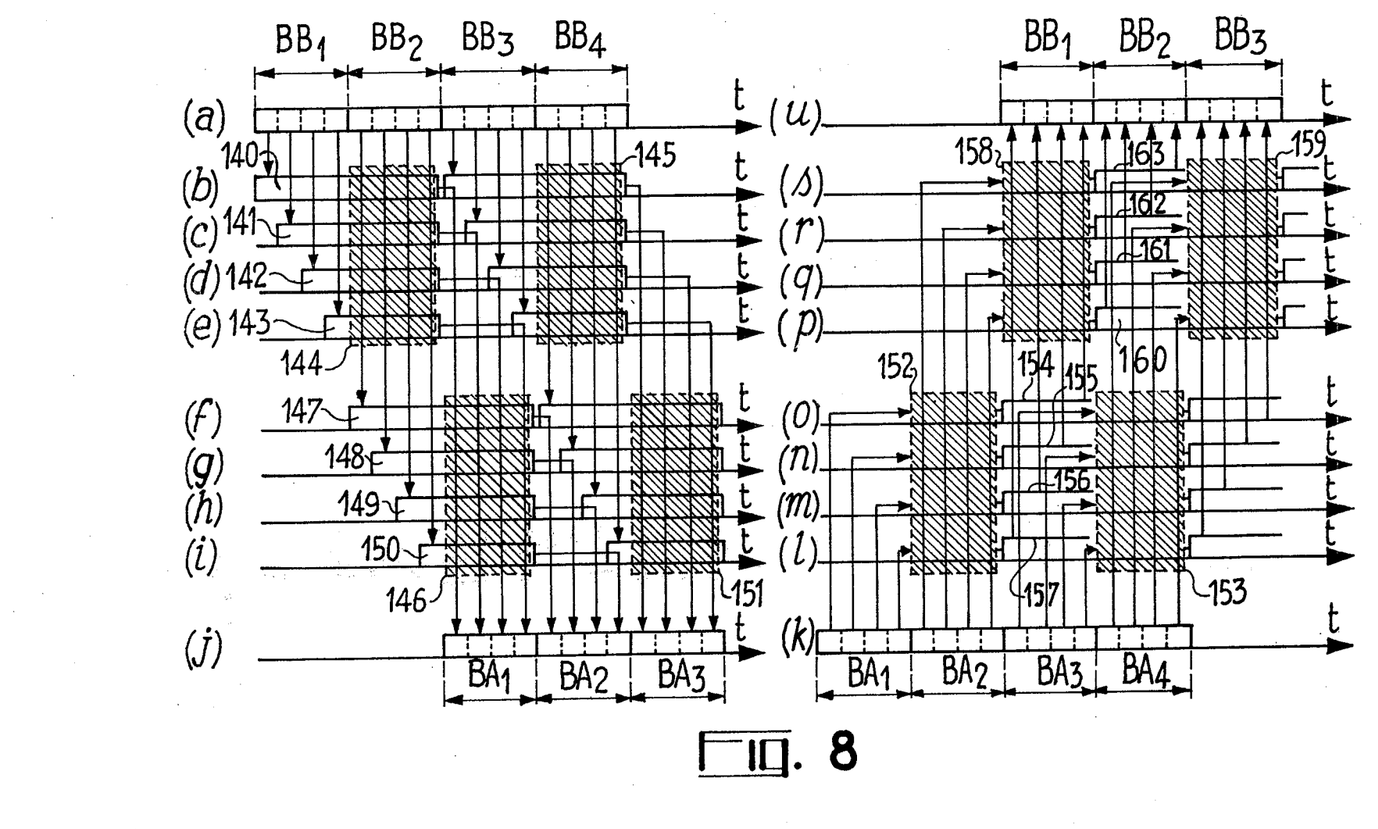
FIG. 8 illustrates the operation of the system shown in FIG. 7.

The process of operation of the system shown in FIG. 7, has been illustrated in FIG. 8.

At (a), there has been illustrated the sequence in time $t$ of four blocks or bits $BB_1$, $BB_2$, $BB_3$ and $BB_4$, each comprising four successive bits. These binary data are applied to the input 1 of the system shown in FIG. 7.

At (b), (c), (d) and (e), there have been illustrated the respective contents of the analogue stores of the block 101. The rectangular areas 140, 141, 142 and 143 respectively symbolise the retention in storage of the four components of the block $BB_1$; the arrows linking $BB_1$ with the said rectangular areas, indicate the transfer of the data of the block 101 as ordered by the top half of the assembly 100, by the register 110 and by the clock 109. At (f), (g), (h), and (i), there have been illustrated the respective contents of the analogue stores of block 102; input of data from the block $BB_2$ to the block 102 takes place as soon as the block $BB_1$ has been stored in the block 101. The rectangular areas 147, 148, 149, and 150 symbolise the retention of the data of block $BB_2$ and the arrows indicate the transfer of these data as ordered by the bottom half of the assembly 100, the register 110 and the clock 109.

As soon as the block of bits $BB_1$ has been stored in the block 101, the computer unit 104 is connected to this latter block and simultaneously receives the four components of the vector $[D_o]$. The computing operation involved by the orthogonal transform, are symbolised by a cross-hatched area 144, which starts as soon as the block $BB_1$ is in storage and terminates before the block $BB_2$ is stored in its turn. The computing area 144 covers the areas 140, 141, 142 and 143 and when it ends, the four analogue components of the vector $[A_o]$, corresponding to the block $BB_1$, are obtained. In line (j) of FIG. 8, the analogue components which are recorded by the magnetic data carrier 114 in track 115, have been shown. These analogue components succeed one another in time t, and are grouped four by four in order to form the blocks $BA_1$, $BA_2$, $BA_3$ ... corresponding respectively to the input blocks $BB_1$, $BB_2$, $BB_3$ .... The broken arrows linking the areas 140, 141, 142 and 143, with the block $BA_1$ indicate the storage of the analogue components computed in the block 106 and their transfer to the recording head 113 via the right-hand halves of the analogue gates 108 which are controlled by the clock 109 through the register 111. The computing area 146 relates to the transformation of the binary data of block $BB_2$; it thus covers the areas 147, 148, 149 and 150 and develops in succession to the computing area 144 since it is the same computer unit 104 which is used. To this end, the computer unit 104 is switched alternately between the blocks 101 and 106 and their counterparts 102 and 107, by switching means 103 and 105 which operate synchronously. The computing areas 144 and 145 correspond to the transformation of odd order blocks $BB_1$ and $BB_3$, whilst those 146 and 151 correspond to the transformation of even order blocks $BB_2$ and $BB_4$.

The right-hand part of the operating diagram shown in FIG. 8, corresponds to the read-out of the data recorded on the magnetic data carrier. In line (k) the succession of blocks $BA_1$, $BA_2$, $BA_3$ and $BA_4$ of analogue data furnished by the read-out head 119 has been shown. At (o), (n), (m) and (l), the respective contents of the four analogue stores of the block 128 have been shown. At (s), (r), (q) and (p), the respective contents of the four analogue stores of the block 129 have been shown. The reverse transform of the block $BA_1$ takes place during the course of the computing area 152 after the analogue data have been stored in the manner indicated by the broken arrows linking the block $BA_1$ to the area 152. When computing has been carried out, four binary components are obtained the storage of which in the block 128, is symbolised by the rectangular areas 154, 155, 156 and 157.

These binary components are transferred from the block 128 to the output elements 133 and 134 through the agency of the analogue gates of the assembly 130 and under the control of the register 132. The reverse transformation of the block $BA_2$ takes place during the computing phase 158 and the resultant binary components are accumulated in the analogue store block 129. These binary data are then transferred by the analogue gates 130 to the output elements 133 and 134. These transfers have been shown in FIG. 8 by the upward arrows which terminate at the line (u) where the succession of blocks of bits $BB_1$, $BB_2$, $BB_3$ ... is reformed.

The computing areas 152 and 153 correspond to the reverse transform of the analogue blocks of odd order $BA_1$ and $BA_3$. The computing areas 158 and 159 correspond to the reverse transform of the analogue blocks of even order $BA_2$ and $BA_4$. The computer units 104 and 126 perform orthogonal transforms such as Fourier or Walsh-Hadamard transforms. In these cases, the direct transform is performed in the same fashion as the reverse transform and in FIG. 1 it will be seen that the majority of the elements used for recording can also be used without modification, for read-out.

The design of a computer unit which will perform the Fourier or Walsh-Hadamard transform of a vector having N analogue components, has been very adequately described in literature on the subject. Such a computer is described in the article entitled "A hybrid Walsh transform computer.", by J. W. Carl and R. V. Swartwood, from IEEE Transactions on computers, Volume C 22, No. 7, July 1973 pages 669 to 672. It can be put into effect using a relatively small number of amplifiers, with the help of iterative techniques. If calculation is carried out in analogue fashion, then the components of the transformed vector are obtained directly at the output of the computer unit.

If calculation is effected by a digital computer programmed using the known algorithms of the aforementioned orthogonal transforms, then the components are produced in the form of trains of $n$ bits. These trains of bits are then converted into analogue values by a digital-analogue converter following the computer unit 104. A similar arrangement is employed at read-out in order to make it possible for a programmed digital computer unit 126 to carry out processing and perform the reverse orthogonal transform.

The reference track 117 makes it possible to readily mark the different blocks of analogue components recorded on the magnetic data carrier. This track is not essential if the blocks are separated on the track 115. The scanning of the blocks by the read-out head 119 can then furnish the synchronising signal required by the clock 125.

What we claim is:

1. A communication system for the dissemination of digital data constituted by a succession of 0 and 1 bits coming from a data source, said communication system comprising: grouping means fed from said data source for grouping said bits in the form of vectors of N binary components, orthogonal transformation means receiving the vectors having said binary components and converting them into orthogonal vectors each having N analogue components, analogue means arranged for disseminating said orthogonal vectors, reverse transformation means receiving the disseminated orthogonal vectors, available at the output of said analogue means, and means for reconstituting said succession of bits from the reconstructed vectors of N binary components furnished by said reverse transformation means.

2. A communication system as claimed in claim 1, wherein said analogue disseminating means comprise means for recording said analogue components on a magnetic carrier.

3. A communication system as claimed in claim 1, wherein said orthogonal transformation is a Walsh-Hadamard transform.

4. A communication system as claimed in claim 1, wherein threshold transmission means are arranged between the output of said analogue dissemination means and the input of said reverse transformation means.

5. A communication system as claimed in claim 1, wherein said means for reconstituting said succession of bits, comprise reshaping means operating at a decision level located substantially at half the amplitude of the 1 bits produced by said reverse transformation means.

6. A communication system as claimed in claim 4, wherein said threshold transmission means selectively transmit said analogue components having an absolute value below said threshold; the number N of components in said blocks being chosen sufficiently high to ensure that the signals furnished by said threshold transmission means cannot, after said reverse transformation give rise to reversal of the 0 and 1 bits.

7. A communication system as claimed in claim 1, wherein said grouping means comprise series-parallel conversion means successively receiving said bits and simultaneously delivering the N binary components of one at least of the vectors which are to be transformed; said reconstituting means comprising parallel-series conversion means simultaneously receiving the N binary components delivered by said reverse transformation means, and reconstituting them successively in order to restore said succession of 0 and 1 bits.

8. A communication system as claimed in claim 1, wherein said analogue means successively disseminate the N analogue components of said orthogonal vectors; parallel-series and series-parallel conversion means ensuring successive dissemination of said orthogonal vectors at equal, markable time intervals.

9. A communication system as claimed in claim 1, wherein said orthogonal transformation means comprise at least one computer unit performing said transformation in a time less than N times the duration of said bits; switching means being associated with the input and the output of said computer unit in order to alternately transmit the N components of one vector and the N components of the particular succeeding one.

10. A communication system as claimed in claim 1, wherein said orthogonal transformation is performed by a computer unit carrying out a Walsh-Hadamard transform on an N-component vector; means being provided to translate the amplitude of the output component of index zero, by an amount equal to the mean value of said component, so that all the output components have a zero mean value.

* * * * *